(12) United States Patent
Song et al.

(10) Patent No.: US 9,874,676 B2
(45) Date of Patent: Jan. 23, 2018

(54) LIGHT GUIDE PLATE, AND BACKLIGHT UNIT AND MOBILE DEVICE INCLUDING THE SAME

(71) Applicant: LG DISPLAY CO., LTD., Seoul (KR)

(72) Inventors: Young Ki Song, Paju-si (KR); MyungJoon Park, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 61 days.

(21) Appl. No.: 15/220,855

(22) Filed: Jul. 27, 2016

(65) Prior Publication Data

US 2017/0031082 A1  Feb. 2, 2017

(30) Foreign Application Priority Data

Jul. 29, 2015 (KR) .................. 10-2015-0107390

(51) Int. Cl.
*F21V 8/00* (2006.01)
*G02F 1/1335* (2006.01)

(52) U.S. Cl.
CPC ......... *G02B 6/0036* (2013.01); *G02B 6/0016* (2013.01); *G02B 6/0038* (2013.01); *G02B 6/0061* (2013.01); *G02B 6/0058* (2013.01); *G02B 6/0073* (2013.01); *G02F 1/133603* (2013.01); *G02F 1/133606* (2013.01); *G02F 2001/133607* (2013.01)

(58) Field of Classification Search
CPC .... G02B 6/0036; G02B 6/006; G02B 6/0038; G02B 6/0016; G02B 6/0073; G02B 6/0058; G02F 2001/133607; G02F 1/133603; G02F 1/133606

See application file for complete search history.

(56) References Cited

U.S. PATENT DOCUMENTS

| | | | |
|---|---|---|---|
| 5,396,350 A * | 3/1995 | Beeson ............... | F21V 5/02 349/62 |
| 6,011,602 A * | 1/2000 | Miyashita .......... | G02B 6/0038 349/61 |
| 8,199,279 B2 * | 6/2012 | Choi .................. | G02B 6/0038 349/62 |
| 2007/0057031 A1 | 3/2007 | Lee | |
| 2008/0231590 A1 * | 9/2008 | Choi .................. | G02B 6/0036 345/102 |
| 2009/0296373 A1 * | 12/2009 | Chang ................ | G02B 6/0078 362/97.1 |
| 2010/0165659 A1 | 7/2010 | Ise et al. | |
| 2010/0208169 A1 * | 8/2010 | Mun .................. | G02F 1/133555 349/65 |

(Continued)

*Primary Examiner* — Joseph L Williams
*Assistant Examiner* — Jose M Diaz
(74) *Attorney, Agent, or Firm* — Dentons US LLP

(57) ABSTRACT

A light guide plate in accordance with various embodiments comprises: a body having a light incident part at a first side surface of the body; an upper optical pattern at a top side of the body; and a lower optical pattern at a bottom side of the body, wherein the lower optical pattern is an embossed pattern protruding from the bottom side of the body and having a trapezoid shape, wherein a first end of the trapezoid shape has a first width and a second end of the trapezoid shape has a second width, wherein the first end is closer to the light incident part than the second end, and wherein the first width is narrower than the second width.

20 Claims, 13 Drawing Sheets

(56) References Cited

U.S. PATENT DOCUMENTS

| | | | |
|---|---|---|---|
| 2012/0008067 A1* | 1/2012 | Mun | G02B 6/003 349/65 |
| 2013/0128620 A1* | 5/2013 | Kosuge | G02B 6/0035 362/623 |
| 2014/0029306 A1 | 1/2014 | Sakamoto et al. | |
| 2014/0063414 A1 | 3/2014 | Kim et al. | |
| 2015/0131317 A1* | 5/2015 | Yuki | G02B 6/002 362/610 |
| 2015/0185398 A1 | 7/2015 | Chang et al. | |
| 2016/0349438 A1* | 12/2016 | Ma | G02B 6/0036 |
| 2017/0038515 A1* | 2/2017 | Yuki | G02B 6/0036 |

* cited by examiner

| Vertical angle(°) | 90 | 95 | 100 | 105 |
|---|---|---|---|---|
| Front luminance | | | | |
| Front luminance deviation | 0.876 | 0.769 | 0.648 | 0.538 |
| Vertical angle(°) | 110 | 115 | 120 | 125 |
| Front luminance | | | | |
| Front luminance deviation | 0.453 | 0.462 | 0.578 | 0.597 |

[Overall driving of LED]     [Partial driving of LED]

LIGHT GUIDE PLATE, AND BACKLIGHT UNIT AND MOBILE DEVICE INCLUDING THE SAME

CROSS-REFERENCE TO RELATED APPLICATIONS

This application claims the benefit of Korean Patent Application No. 10-2015-0107390 filed on Jul. 29, 2015, which is hereby incorporated by reference as if fully set forth herein.

BACKGROUND

Field of the Invention

The present invention relates to a light guide plate, and a backlight unit and an electronic device including the same.

Discussion of the Related Art

Generally, liquid crystal display (LCD) devices are being widely used as display screens of various products such as televisions (TVs), notebook computers, monitors, etc., in addition to mobile devices such as mobile communication terminals, electronic notebooks, e-books, portable multimedia players (PMPs), navigation devices, ultra-mobile personal computers (UMPCs), mobile phones, smartphones, tablet personal computers (PCs), watch phones, etc.

Recently, mobile devices have a partial display function for quickly executing a message function, a call function, a music reproduction function, a watch function, and a camera function by using a fast execution screen which is locally displayed on a display screen of a liquid crystal display panel.

FIG. 1 is a diagram for describing a partial display function performed by a related art mobile device.

Referring to FIG. 1, the related art mobile device includes a liquid crystal display panel 10, which displays a fast execution screen 12, and a backlight unit 20 that irradiates light 25 onto a rear surface of the liquid crystal display panel 10.

The liquid crystal display panel 10 includes a plurality of pixels and displays the fast execution screen 12 on a predetermined local area by turning on a thin film transistor (TFT) which is provided in each of the plurality of pixels.

The backlight unit 20 includes a light guide plate 21, which is disposed on the rear surface of the liquid crystal display panel 10, and a light source unit 23 including a plurality of light emitting diodes (LEDs) that irradiate light onto one side surface of the light guide plate 21.

In the related art mobile device, when the partial display function is performed, the backlight unit 20 drives all of the plurality of LEDs to irradiate the light 25 onto the whole rear surface of the liquid crystal display panel 10, and the liquid crystal display panel 10 locally displays the fast execution screen 12 through partial driving. That is, the related art mobile device displays the fast execution screen 12 by driving all the LEDs of the backlight unit 20 and partially driving the liquid crystal display panel 10.

In the related art mobile device, when displaying the fast execution screen 12, power may be unnecessarily consumed by LEDs irrelevant to the fast execution screen 12. For this reason, since the related art mobile device may not control a partial luminance of the backlight unit, all the LEDs of the backlight unit are driven when executing a partial display function, causing an increase in power consumption.

SUMMARY

Accordingly, the present invention is directed to a light guide plate, and a backlight unit and an electronic device including the same that substantially obviate one or more problems due to limitations and disadvantages of the related art.

An aspect of the present invention is directed to a light guide plate and a backlight unit including the same, which control partial luminance.

Another aspect of the present invention is directed to provide a mobile device in which power consumption is reduced or minimized when displaying a fast execution screen.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a light guide plate comprising: a body having a light incident part at a first side surface of the body; an upper optical pattern at a top side of the body; and a lower optical pattern at a bottom side of the body, wherein the lower optical pattern is an embossed pattern protruding from the bottom side of the body and having a trapezoid shape, wherein a first end of the trapezoid shape has a first width and a second end of the trapezoid shape has a second width, wherein the first end is closer to the light incident part than the second end, and wherein the first width is narrower than the second width.

In one or more embodiments, the trapezoid shape comprises a top pattern, a bottom pattern, a lower surface pattern, a first side pattern, and a second side pattern, wherein the top pattern is proximate the bottom side of the body, and wherein the top pattern has a trapezoid shape having a first size and including a top side having a first width and a bottom side having a second width narrower than the first width.

In one or more embodiments, the first width of the top side of the top pattern is two or more times the second width of the bottom side of the top pattern.

In one or more embodiments, the top pattern has an equiangular trapezoid shape.

In one or more embodiments, the bottom pattern has a trapezoid shape which has a second size less than the first size and faces the top pattern.

In one or more embodiments, the bottom pattern includes a top side, which coincides with the top side of the top pattern, and a bottom side having a third width narrower than the second width.

In one or more embodiments, a length between the top side of the bottom pattern and the bottom side of the bottom pattern is the same as a length of the top side of the bottom pattern.

In one or more embodiments, the bottom pattern is inclined by a first angle from the top pattern, wherein the first angle is in the range from 4 degrees to 10 degrees, and wherein the axis of inclination coincides with the top sides of the top pattern and bottom pattern.

In one or more embodiments, the lower surface pattern faces the light incident part and is provided between the bottom side of the top pattern and the bottom side of the bottom pattern, and is inclined by a second angle from the top pattern, wherein the second angle is 45 degrees or more, and wherein the axis of inclination coincides with the bottom side of the top pattern.

In one or more embodiments, the lower surface pattern has an equiangular trapezoid shape.

In one or more embodiments, the first and second side patterns are provided in a triangular shape between the top pattern and the bottom pattern and are inclined.

In one or more embodiments, the lower optical pattern comprises a plurality of optical elements, wherein a density of optical elements in a first region of the light guide plate is different from a density of optical elements in a second region of the light guide plate.

In one or more embodiments, the lower optical pattern has a density, which increases in a direction from the first side surface of the body to a second side surface of the body opposite the first side surface.

In one or more embodiments, the upper optical pattern comprises a plurality of lenticular lens patterns or round prism patterns extending in parallel along a direction from the first side surface of the body to a second side surface of the body opposite the first side surface.

In one or more embodiments, side surfaces of adjacent lenticular lens patterns or round prism patterns of the plurality of lenticular lens patterns or round prism patterns contact each other.

In one or more embodiments, the plurality of lenticular lens patterns or round prism patterns are spaced at constant intervals, or an interval of first lenticular lens patterns or round prisms patterns of the plurality of lenticular lens patterns or round prism patterns, which are disposed in a partial luminance area of the light guide plate, differs from an interval of second lenticular lens patterns or round prism patterns of the plurality of lenticular lens patterns or round prism patterns, which are disposed in an area of the light guide plate other than the partial luminance area.

In one or more embodiments, a width of the round prism patterns is in the range from 20 µm to 30 µm, and a height of the round prism patterns is in the range from 4 µm to 10 µm.

In one or more embodiments, the light incident part includes a side light collection pattern and a side diffusion pattern, wherein the side light collection pattern includes a plurality of lenticular lens patterns in a partial luminance area corresponding to a partial display area, and wherein the side diffusion pattern includes a plurality of prism patterns in a surrounding area of the partial luminance area.

In one or more embodiments, the light guide plate, further comprises a light non-incident part at a second side surface of the body opposite the first side surface.

In one or more embodiments, the light guide plate is in a plate form having a short side and a long side, wherein the light incident part and the light non-incident part are at the short side of the body, or wherein the light incident part and the light non-incident part are at the long side of the body.

In one or more embodiments, the body is formed of a material selected from among poly methyl methacrylate, polyethersulfone, polycarbonate, acrylonitrile styrene, polyesterimide, polymethylpentene, polystyrene, polyamide, and silicon.

In one or more embodiments, the round prism patterns each comprise a curved part that includes an isosceles triangle-shaped cross-sectional surface including a bottom side, which coincides with the top side of the body, and has a vertex which is rounded at a certain radius of curvature.

In one or more embodiments, the radius of curvature is in the range from 8 µm to 15 µm.

In one or more embodiments, a vertical angle of each round prism pattern is an obtuse angle.

In one or more embodiments, the vertical angle is in the range from 100 degrees to 120 degrees.

In another aspect of the present invention, there is provided a backlight unit comprising: a light guide plate according to one or more embodiments described herein, wherein the backlight unit is configured to irradiate light selectively onto a whole display area of a liquid crystal display panel or onto a partial display area defined in the liquid crystal display panel; and a light source unit adjacent to the light incident part of the light guide plate.

In one or more embodiments, the backlight unit further comprises: a reflective sheet at a bottom side of the light guide plate; and an optical sheet part at a top side of the light guide plate.

In one or more embodiments, the light source unit comprises a plurality of LED packages divided into a plurality of light emitting array groups, wherein each of the light emitting array groups includes one or more LED packages disposed adjacent to one another, and wherein the backlight unit is configured to drive each of the light emitting array groups individually.

In another aspect of the present invention, there is provided a mobile device

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Figure 1:
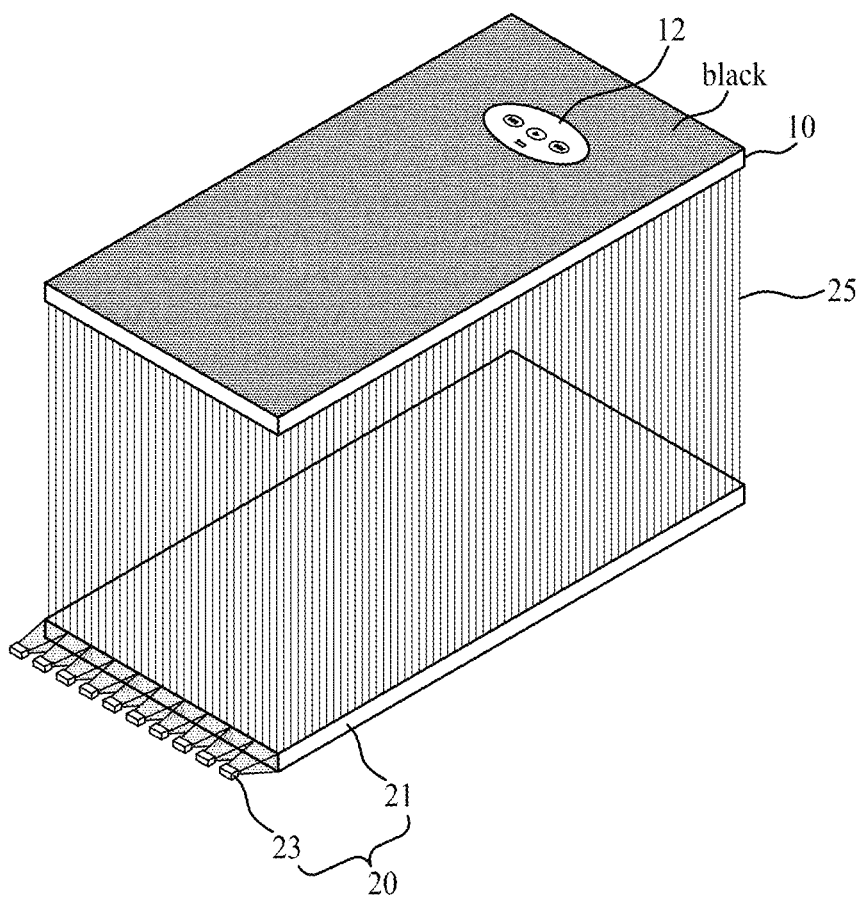
FIG. 1 is a diagram for describing a partial display function performed by a related art mobile device.

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of a light guide plate, and a backlight unit and a mobile device including the same according to the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

Figure 2A:
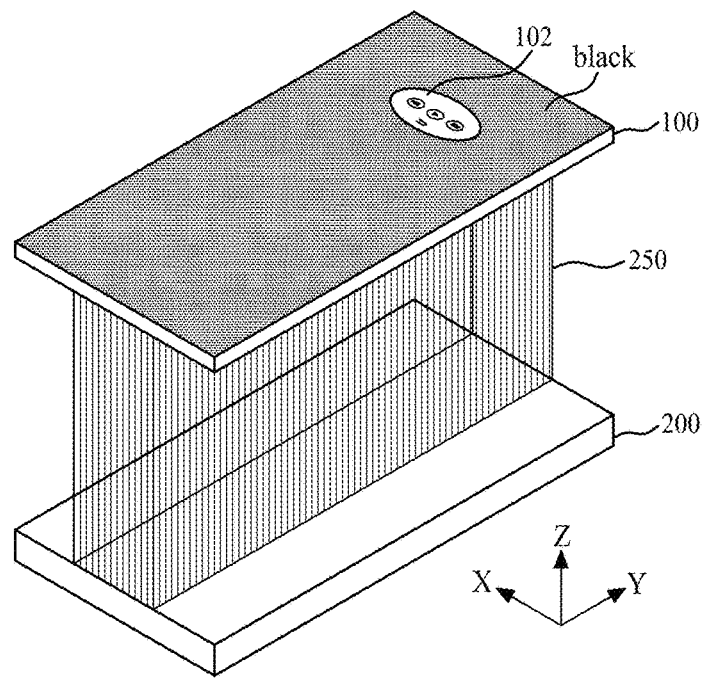
FIGS. 2A and 2B are diagrams for describing a partial display function performed by a mobile device according to an embodiment of the present invention.
Figure 2B:
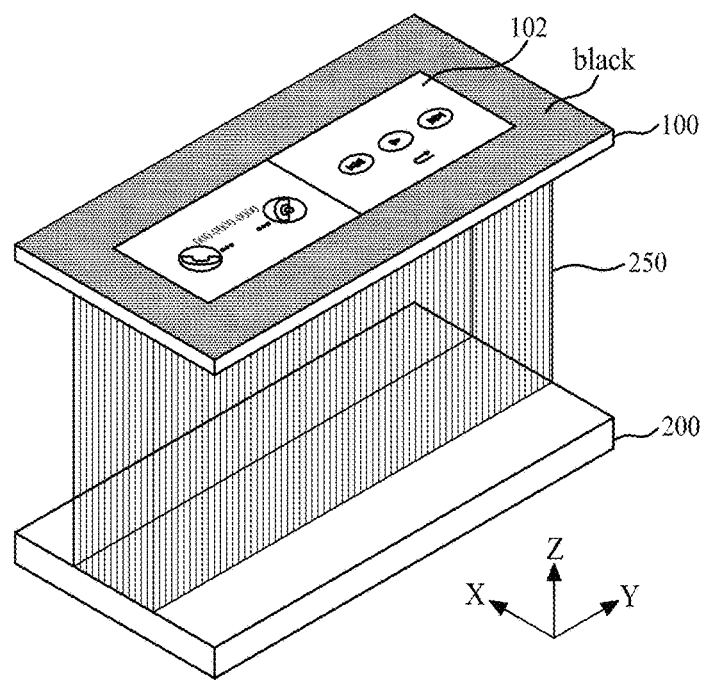

FIGS. 2A and 2B are diagrams for describing a partial display function performed by a mobile device according to an embodiment of the present invention.

Referring to FIGS. 2A and 2B, the mobile device according to an embodiment of the present invention may include a liquid crystal display panel 100, which displays a fast execution screen 102, and a backlight unit 200 that irradiates light 250 onto a partial display area (or a partial driving area) corresponding to the fast execution screen 102 defined in the liquid crystal display panel 100.

The liquid crystal display panel 100 may include a plurality of pixels and may display the fast execution screen 102 on the partial display area by turning on a thin film transistor (TFT) provided in each of the plurality of pixels.

The fast execution screen 102 may display images corresponding to partial display application functions such as a message function, a call function, a music reproduction function, a watch function, a camera function, etc. The fast execution screen 102 according to an embodiment, as illustrated in FIG. 2A, may be displayed in a circular shape on a middle portion of an upper edge with respect to a long side lengthwise direction Y of the liquid crystal display panel 100, but is not limited thereto. In other embodiments, the fast execution screen 102 may be displayed in a polygonal shape, a heart shape, an elliptical shape, or the like. According to another embodiment, as illustrated in FIG. 2B, the fast execution screen 102 may be displayed in a rectangular shape on a middle portion of the liquid crystal display panel 100 in parallel with the long side lengthwise direction Y of the liquid crystal display panel 100. In this case, images respectively corresponding to at least two partial display applications may be displayed on the fast execution screen 102.

The backlight unit 200 may irradiate the light 250 onto a whole rear surface of the liquid crystal display panel 100 or may irradiate the light 250 onto only a partial luminance area corresponding to the partial display area defined in the liquid crystal display panel 100. That is, the backlight unit 200 may irradiate the light 250 onto the whole rear surface of the liquid crystal display panel 100 when the liquid crystal display panel 100 is overall driven. On the other hand, when the liquid crystal display panel 100 is partially driven according to a partial display application function being executed by the mobile device, the backlight unit 200 may irradiate the light 250 onto only the partial luminance area of the liquid crystal display panel 100 according to partial luminance control.

In the mobile device according to an embodiment of the present invention, when the liquid crystal display panel 100 is partially driven according to execution of the partial display application function, the backlight unit 200 may be partially driven, thereby reducing power consumption.

Figure 3:
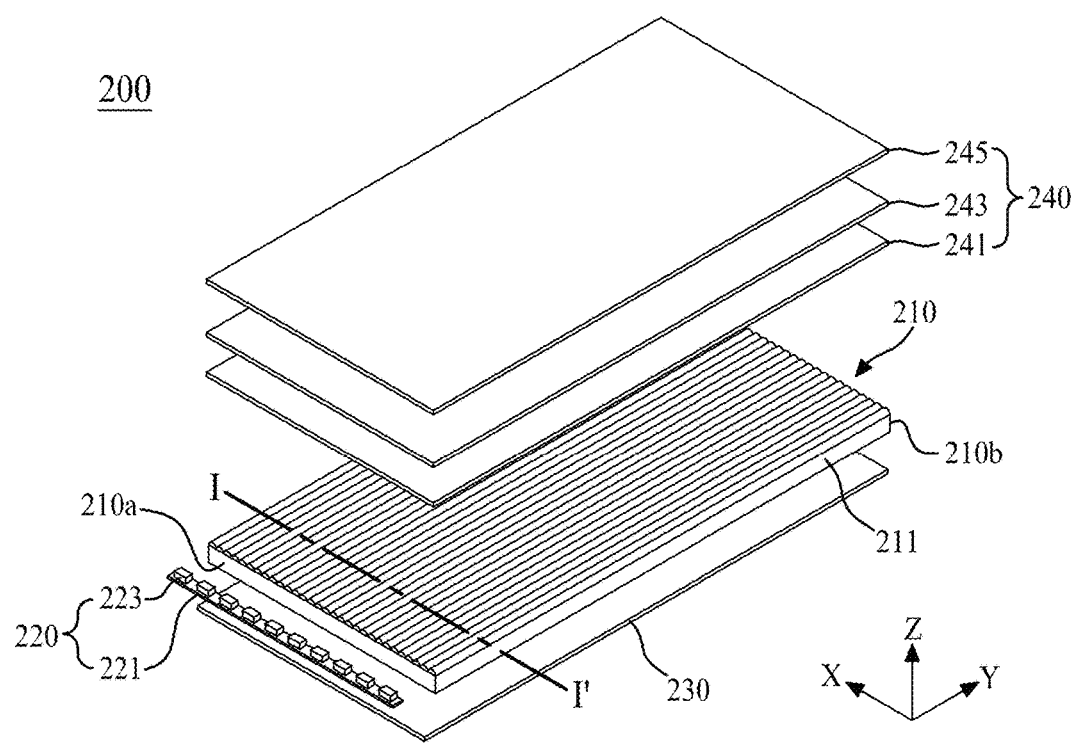
FIG. 3 is an exploded perspective view for describing a backlight unit according to an embodiment of the present invention.
Figure 4:
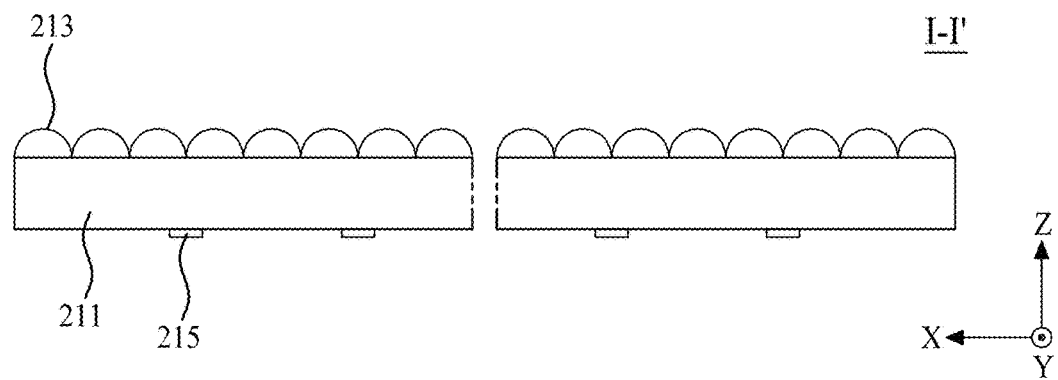
FIG. 4 is a cross-sectional view of a light guide plate taken along line I-I' of FIG. 3.

FIG. 3 is an exploded perspective view for describing a backlight unit 200 according to an embodiment of the present invention, and FIG. 4 is a cross-sectional view of a light guide plate taken along line I-I' of FIG. 3.

Referring to FIGS. 3 and 4, the backlight unit 200 according to an embodiment of the present invention may include a light guide plate 210, a light source unit 220, a reflective sheet 230, and an optical sheet part 240.

The light guide plate 210 may transfer light, which is irradiated from the light source unit 220 onto a light incident part 210a disposed on one side surface, in an up direction Z. Here, the light incident part 210a may be a short side of the light guide plate 210, but is not limited thereto. In other embodiments, the light incident part 210a may be a long side of the light guide plate 210 depending on a position at which the light source unit 220 is disposed. In the following description, it is assumed that the light incident part 210a is the short side of the light guide plate 210.

The light guide plate 210 according to a first embodiment of the present invention may include a body 211, an upper optical pattern 213, and a lower optical pattern 215.

The body 210 may be formed in a plate form having a short side and a long side. One side of the short side of the body 211 may be defined as the light incident part 210a, and the other side of the short side of the body 211 may be defined as a light non-incident part 210b. The body 211 may be formed of one material selected from among poly methyl methacrylate, polyethersulfone, polycarbonate, acrylonitrile styrene, polyesterimide, polymethylpentene, polystyrene, polyamide, and silicon.

The upper optical pattern 213 according to an embodiment may be provided on a top of the body 211 to have a constant interval and may include a curved surface. The upper optical pattern 213 may control a path of light incident on the light incident part 210a of the body 211. The upper optical pattern 213 may enhance linearity of the light incident on the light incident part 210a to cause the light to travel to the light non-incident part 210b of the body 211, thereby enhancing the partial luminance of the light guide plate 210. The upper optical pattern 213 according to an embodiment may be convexly provided on the top of the body 211 to have a semicircular shape. That is, the upper optical pattern 213 may include a plurality of lenticular lens patterns which extend in parallel from one side to the other side of the short side of the body 211 along a second direction Y corresponding to a length of the long side of the body 211 (in other words, the lens axes extend along the Y direction). In this case, side surfaces of adjacent lenticular lens patterns may contact each other without being spaced apart from each other.

The lower optical pattern 215 may be provided on a bottom of the body 211 to have a polygonal shape. In this case, the lower optical pattern 215 may have a density which increases in a direction from the one side to the other side of the short side of the body 211. That is, the lower optical pattern 215 may have a density which is relatively low in an area adjacent to the light incident part 210a of the body 211, in order not to obstruct diffusion of the light incident on the light incident part 210a of the body 211. Also, the lower optical pattern 215 may have a density which progressively increases from a middle portion to the other end of the body 211, for guiding a path of the incident light to further enhance linearity. To this end, the lower optical pattern 215 according to an embodiment may be an embossed pattern protruding from the bottom of the body 211 to have a trapezoid shape. The lower optical pattern 215 will be described below in detail.

In the light guide plate 210, the upper optical pattern 213 further enhances the linearity of the light which travels from the light incident part 210a to the light non-incident part 210b, and the linearity of the light which travels from the light incident part 210a to the light non-incident part 210b is further enhanced by controlling a path of the light, based on the density of the lower optical pattern 215. Accordingly, according to an embodiment of the present invention, the linearity of the light incident through the light incident part 210a of the light guide plate 210 is enhanced due to a combination of the upper optical pattern 213 and the lower optical pattern 215 included in the light guide plate 210, thereby enabling the light to be partially output for each of a plurality of areas.

The light source unit 220 may be disposed adjacent to the light incident part 210a defined as one side surface of the light guide plate 210 and may irradiate the light onto the light incident part 210a. The light source unit 220 according to an embodiment may include a plurality of light emitting diode (LED) packages 223 that are mounted on a light-source printed circuit board (PCB) 221, emit the light with a light source driving power, and irradiate the light onto the light incident part 210a of the light guide plate 210.

The plurality of LED packages 223 may be mounted on the light-source PCB 221 at intervals, which are set along a first direction X corresponding to a short side lengthwise direction of the light guide plate 210, to face the light incident part 210a of the light guide plate 210. In this case, an interval between adjacent LED packages 223 may be adjusted within a range where hot spot caused by the light emitted from the LED packages 223 does not occur in the light incident part 210a of the light guide plate 210.

The plurality of LED packages 223 may be divided into a plurality of light emitting array groups, based on the partial luminance area defined in the light guide plate 210. Each of the light emitting array groups may include one or more LED packages 223 which are adjacent to each other in the first direction X, and a same or different number of LED packages 223 may be included in each of the light emitting array groups. Each of the light emitting array groups may be individually driven according to local dimming driving.

According to a first embodiment, the light source unit 220 may include first and second light emitting array groups including a same number of LED packages 223 arranged along the first direction X.

According to a second embodiment, the light source unit 220 may include first to third light emitting array groups arranged along the first direction X. For example, the first light emitting array group may include a plurality of LED packages which are disposed on one side of the short side of the light guide plate 210, the second light emitting array group may include a plurality of LED packages which are disposed in a middle portion of the short side of the light guide plate 210, and the third light emitting array group may include a plurality of LED packages which are disposed on the other side of the short side of the light guide plate 210. Here, the first and third light emitting array groups may include a same number of LED packages 223, and the second light emitting array group may include LED packages 223 equal to the total number of the LED packages 223 included in the first and third light emitting array groups.

According to a third embodiment, the light source unit 220 may include first to fifth light emitting array groups arranged along the first direction X. For example, the first light emitting array group may include a plurality of LED packages which are disposed on one side of the short side of the light guide plate 210, the second light emitting array group may include a plurality of LED packages which are disposed in a middle portion of the short side of the light guide plate 210, and the third light emitting array group may include a plurality of LED packages which are disposed on the other side of the short side of the light guide plate 210. Also, the fourth light emitting array group may include a plurality of LED packages which are disposed on the other side of the short side of the light guide plate 210, and the fifth light emitting array group may include a plurality of LED packages which are disposed between the second and fourth light emitting array groups. Here, the first, second and fourth light emitting array groups may include a same number of LED packages 223, and the third and fifth light emitting array groups may include a greater number of LED packages 223 than the first light emitting array group.

In addition, the plurality of light emitting array groups may be used to irradiate the light onto only the partial luminance area included in the partial display area defined in the liquid crystal display panel when the mobile device executes the partial display application function, and may be variously set based on a position of the partial luminance area.

The reflective sheet 230 may be disposed on a bottom of the light guide plate 210 and may reflect the light, irradiated from the light guide plate 210, toward the light guide plate 210, thereby minimizing the loss of the light.

The optical sheet part 240 may be disposed on the light guide plate 210 and may include a lower diffusive sheet 241, a lower prism sheet 243, and an upper prism sheet 245, but is not limited thereto. In other embodiments, the optical sheet part 240 may include a stacked combination of two or more elements selected from a diffusive sheet, a prism sheet, a dual brightness enhancement film, and a lenticular sheet.

Figure 5:
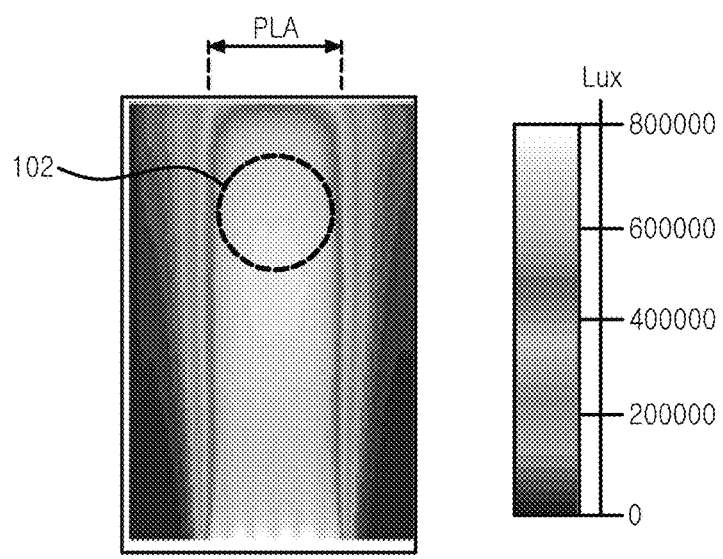
FIG. 5 is a diagram showing a simulation result of a front luminance of a light guide plate according to a first embodiment of the present invention.

FIG. 5 is a diagram showing a simulation result of a front luminance of a light guide plate according to a first embodiment of the present invention. The simulation result is a result which has been obtained by measuring the front luminance of the light guide plate in a state where six LED packages disposed in a middle portion among a plurality of LED packages are driven to irradiate light onto a partial luminance area corresponding to a center area of a short side of the light guide plate.

As seen in FIG. 5, in the light guide plate according to the first embodiment of the present invention, light which is irradiated by driving some LED packages corresponding to the fast execution screen 102 of the liquid crystal display panel has linearity due to the upper optical pattern consisting of a lenticular lens pattern, and thus, it can be seen that a relatively more amount of light is output in only a partial luminance area PLA. In this case, the amount of light which is output in the partial luminance area PLA has been measured as 68% of the total amount of light, and since some LED packages are driven, power consumption is reduced by 50% in comparison with a case where all LED packages are driven.

In the backlight unit 200 according to an embodiment of the present invention, a linearity of the light incident on the light incident part 210a of the light guide plate 210 is enhanced due to a combination of the upper optical pattern 213 and the lower optical pattern 215 of the light guide plate 210, and thus, partial light output and partial luminance control for each area may be performed by partially driving the light source unit 220, thereby controlling the partial luminance of the liquid crystal display panel. That is, in the backlight unit 200 according to an embodiment of the present invention, when the fast execution screen is displayed on the liquid crystal display panel according to the partial display application function being executed by the mobile device, light may be irradiated onto only the partial luminance area by driving only some LED packages 223 corresponding to the partial luminance area of the liquid crystal display panel, and thus, the other LED packages 223 irrelevant to the partial luminance area of the liquid crystal display panel are prevented from unnecessarily emitting light (in other words, the other LED packages may be turned off when the fast execution screen is displayed). Accordingly, power consumption is reduced, and the amount of light which travels to an area other than the partial luminance area of the liquid crystal display panel is minimized, thereby irradiating uniform light onto the partial luminance area of the liquid crystal display panel.

Figure 6:
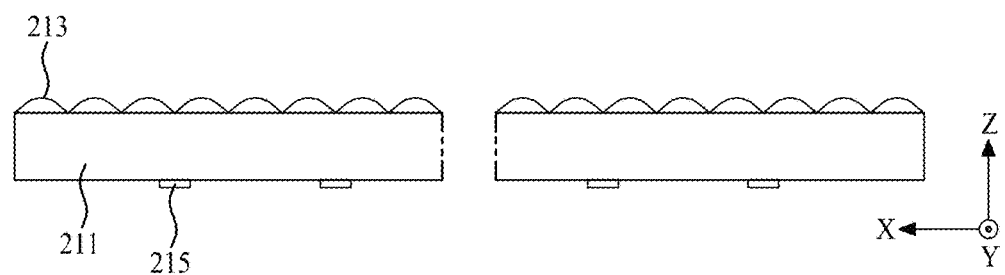
FIG. 6 is a cross-sectional view for describing a light guide plate according to a second embodiment of the present invention.
Figures 7, 8:
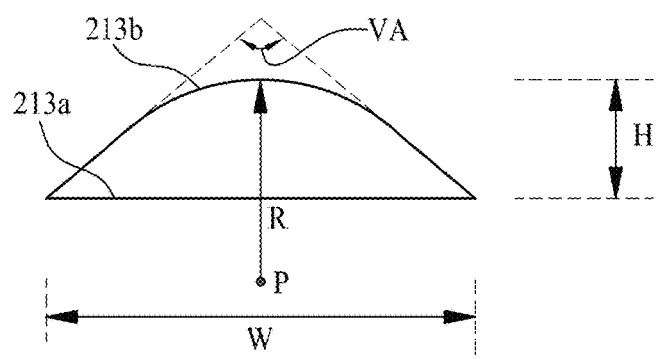
FIG. 7 is a cross-sectional view illustrating an upper optical pattern illustrated in FIG. 6.
FIG. 8 is a graph showing a simulation result of a front luminance deviation and front luminance based on a vertical angle of a round prism pattern in a light guide plate according to a second embodiment of the present invention.

FIG. 6 is a cross-sectional view for describing a light guide plate according to a second embodiment of the present invention, and FIG. 7 is a cross-sectional view illustrating an upper optical pattern illustrated in FIG. 6. The upper optical pattern is provided by modifying a structure of the upper optical pattern of the light guide plate according to the first embodiment. Hereinafter, therefore, only the upper optical pattern among elements of the light guide plate according to the second embodiment of the present invention will be described, and the other elements are not described.

An upper optical pattern 213 according to another embodiment may be provided on a top of a body 211 to have a constant interval and may include a prism form having a curved surface. That is, the upper optical pattern 213 may include a plurality of round prism patterns which extend in parallel from one side to the other side of a short side of the body 211 along a second direction Y corresponding to a length of a long side of the body 211 (in other words, the axes of the round prism patterns extend along the Y direction). In this case, side surfaces of adjacent round prism patterns may contact each other without being spaced apart from each other.

The round prism pattern may include a curved part 213b that includes an isosceles triangle-shaped cross-sectional surface including a bottom side, which is a top of the body 211, and has a vertex which is rounded at a certain radius of curvature "R" with respect to an origin point P.

A vertical angle "VA" of the round prism pattern may be adjusted to an obtuse angle, for example, 100 degrees to 120 degrees, but is not limited thereto. In other embodiments, the vertical angle "VA" of the round prism pattern may be adjusted based on a size of a partial luminance area. The curved part 213b of the round prism pattern may have a radius of curvature "R" of 8 μm to 15 μm, but is not limited thereto. In other embodiments, the curved part 213b may be provided based on the size of the partial luminance area. Also, a width "W" of the round prism pattern may be adjusted to 20 μm to 30 μm, and a height "H" of the round prism pattern may be adjusted to 4 μm to 10 μm. However, the present embodiment is not limited thereto, and the width and the height of the round prism pattern may be adjusted based on the size of the partial luminance area.

The upper optical pattern 213 including the round prism pattern minimizes hot spot in comparison with a lenticular lens pattern having a problem where hot spot occurs in a light incident part of the light guide plate, enhances a linearity of light, and outputs the light to the partial luminance area by using a curvature of the curved part 213b.

FIG. 8 is a graph showing a simulation result of a front luminance deviation and front luminance based on a vertical angle of a round prism pattern in a light guide plate according to a second embodiment of the present invention. Here, the front luminance of the light guide plate corresponds to a simulation result of hot spot based on the vertical angle of the round prism pattern, and the front luminance deviation of the light guide plate corresponds to a simulation result which has been obtained when a difference between maximum luminance and minimum luminance based on the vertical angle of the round prism pattern is set to a value between 0 and 1.

As seen in FIG. 8, in the light guide plate according to the second embodiment of the present invention, it can be seen that hot spot is minimized when the vertical angle of the round prism pattern is 100 degrees to 120 degrees, and when the vertical angle of the round prism pattern is less than 100 degrees or more than 120 degrees, hot spot occurs. Also, in the light guide plate according to the second embodiment of the present invention, it can be seen that the front luminance deviation is relatively small when the vertical angle of the round prism pattern is 105 degrees to 120 degrees, and when the vertical angle of the round prism pattern is less than 105 degrees or more than 120 degrees, the front luminance deviation is relatively large. Accordingly, the vertical angle of the round prism pattern may be adjusted to 100 degrees to 120 degrees so that hot spot occurring in the light incident part is minimized and the front luminance deviation is minimized, and for example, may be adjusted to 110 degrees.

Figure 9:
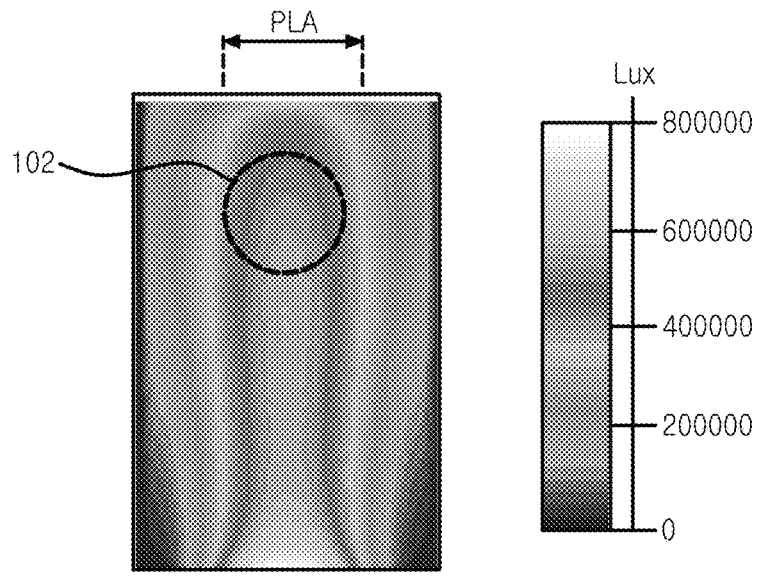
FIG. 9 is a diagram showing a simulation result of a front luminance of the light guide plate according to the second embodiment of the present invention.

FIG. 9 is a diagram showing a simulation result of a front luminance of the light guide plate according to the second embodiment of the present invention. The simulation result has been obtained by measuring the front luminance of the light guide plate in a state where six LED packages disposed in a middle portion among a plurality of LED packages are driven to irradiate light onto a partial luminance area corresponding to a center area of a short side of the light guide plate.

As seen in FIG. 9, in light guide plate according to the second embodiment of the present invention, light which is irradiated by driving some LED packages corresponding to the fast execution screen 102 of the liquid crystal display panel has linearity due to the upper optical pattern consisting of a round prism pattern, and thus, it can be seen that a relatively more amount of light is output in only a partial luminance area PLA. In this case, the amount of light which is output in the partial luminance area PLA has been measured as 80% of the total amount of light, and since some LED packages are driven, power consumption is reduced by 50% in comparison with a case where all LED packages are driven.

The light guide plate according to the second embodiment of the present invention may irradiate light onto only the partial luminance area of the liquid crystal display panel by using a curvature of a curved part 213b provided in an upper optical pattern 213. As a result, according to the present embodiment, a light output area may be effectively controlled by using the curvature of the curved part 213b provided in the upper optical pattern 213 including the round prism pattern provided in the light guide plate 210.

Figure 10:
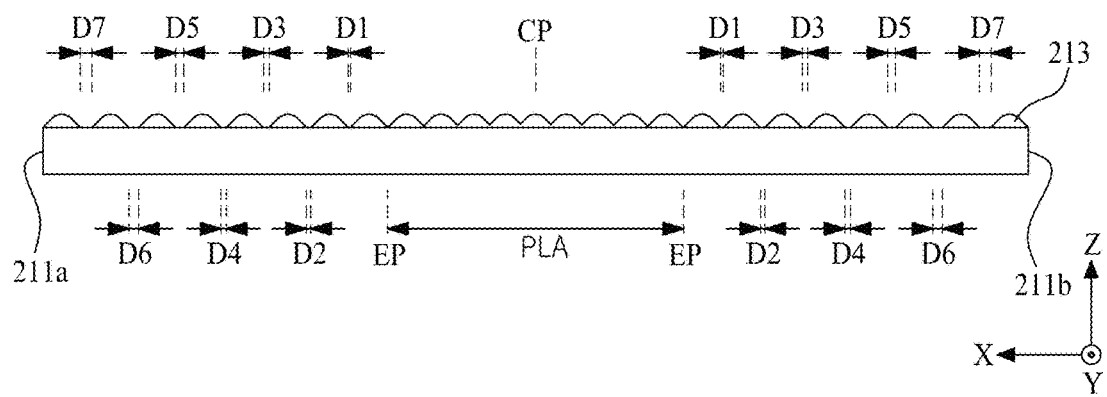
FIG. 10 is a diagram for describing a modification example of an upper optical pattern in the light guide plate according to the second embodiment of the present invention.

In addition, in the light guide plate according to the second embodiment of the present invention, as illustrated in FIG. 10, an interval of the upper optical pattern 213 in a partial luminance area PLA may differ from an interval of the upper optical pattern 213 in a surrounding area other than the partial luminance area PLA. Here, the upper optical pattern 213 may be provided in plurality. A plurality of upper optical patterns 213 overlapping the upper luminance area PLA may be defined as first upper optical patterns, and a plurality of upper optical patterns 213 overlapping the surrounding area of the upper luminance area PLA may be defined as second upper optical patterns.

The first upper optical patterns 213 may be provided to have a relatively narrow interval, and thus, side surfaces of adjacent first upper optical patterns 213 may overlap each other. In this case, the first upper optical patterns 213 may have an interval which is progressively narrowed in a direction from an edge portion EP of the partial luminance area PLA to a center portion CP of the partial luminance area PLA, and thus, an overlap area between the first upper optical patterns 213 may progressively increase in the direction from the edge portion EP of the partial luminance area PLA to the center portion CP of the partial luminance area PLA. Therefore, due to the first upper optical patterns 213 overlapping each other, light incident on the partial luminance area PLA is not diffused to the surrounding area other than the partial luminance area PLA and has far stronger linearity in the partial luminance area PLA. Accordingly, the first upper optical patterns 213 further increase a linearity of light incident on the partial luminance area PLA and prevent the light from being diffused to the surrounding area other than the partial luminance area PLA, thereby increasing the amount of light which travels in the partial luminance area PLA.

The second upper optical patterns 213 may be provided to have relatively wide intervals D1 to D7, and thus, side surfaces of adjacent second upper optical patterns 213 may be spaced apart from each other. In this case, the second upper optical patterns 213 may have the intervals D1 to D7 which is progressively widened in a direction from the edge portion EP of the partial luminance area PLA to a long side 211a or 211b of the light guide plate 210, and thus, a flat surface including a top of a body 211 may be provided between the second upper optical patterns 213. Therefore, light incident on an area other than the partial luminance area PLA may be diffused to an area other than the partial luminance area PLA due to the second upper optical patterns 213 which are spaced apart from each other, and thus, when a light source unit is overall driven (in other words, when all light sources, e.g. LED packages 223, of the light source unit are driven), uniform light is output through a whole surface of the light guide plate 210.

Therefore, in the light guide plate according to the second embodiment of the present invention, since the upper optical patterns 213 corresponding to the partial luminance area PLA of the liquid crystal display panel overlap each other, more uniform light is output to the partial luminance area PLA of the liquid crystal display panel.

Figure 11:
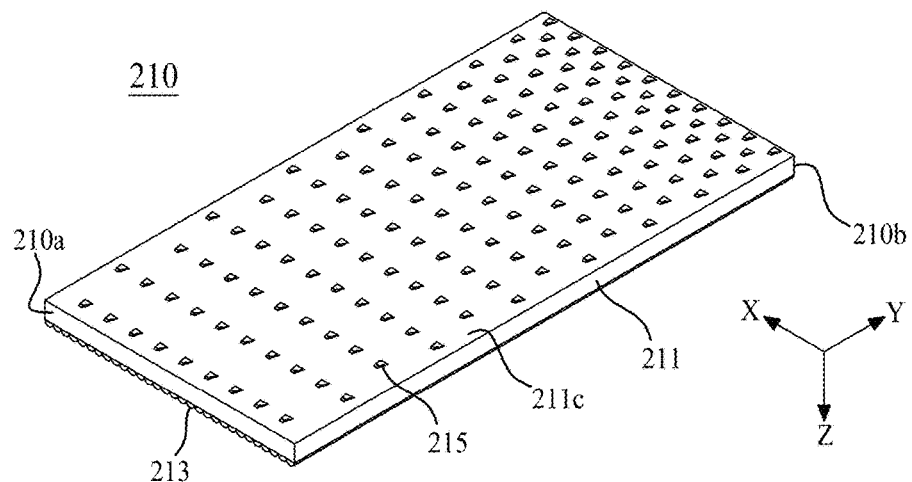
FIG. 11 is a rear view of a light guide plate for describing a lower optical pattern according to an embodiment of the present invention.
Figure 12:
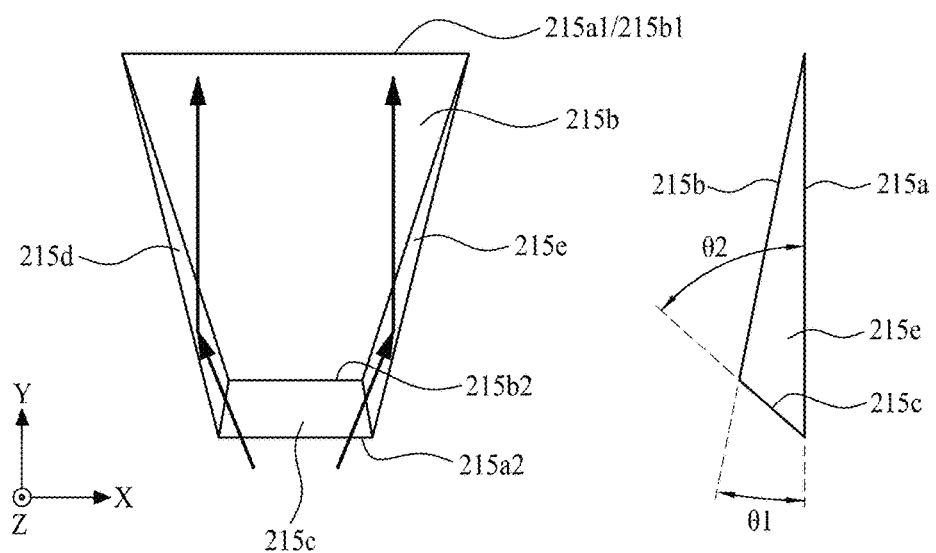
FIG. 12 is a diagram illustrating the lower optical pattern illustrated in FIG. 11.

FIG. 11 is a rear view of a light guide plate for describing a lower optical pattern 215 according to an embodiment of the present invention, and FIG. 12 is a diagram illustrating the lower optical pattern 215 illustrated in FIG. 11. In the following description, when the term "side" is used in connection with a trapezoid shape (e.g. a "top side" or bottom side" of the trapezoid shape), this may be understood to refer to an edge (e.g. top edge or bottom edge) of the trapezoid shape.

Referring to FIGS. 3, 11 and 12, the lower optical pattern 215 according to the present embodiment may be provided on a bottom of a body 211 in an embossed form and may additionally control a path of light which is not controlled by an upper optical pattern 213, thereby further enhancing a linearity of the light. To this end, the lower optical pattern 215 according to the present embodiment may include a top pattern 215a, a bottom pattern 215b, a lower surface pattern 215c, a first side pattern 215d, and a second side pattern 215e.

The top pattern 215a may be a bottom 211c of the body 211 and may have a trapezoid shape having a first size. That is, the top pattern 215a may have an equiangular trapezoid shape that includes a top side 215a1 having a first width and a bottom side 215a2 having a second width narrower than the first width. In this case, the first width of the top side 215a1 may be two or more times the second width of the bottom side 215a2. A length of the top pattern 215a and a length between the top side 215a1 and the bottom side 215a2 may each be the same as that of the top side 215a1.

The bottom pattern 215b may have a trapezoid shape which has a second size less than the first size and face the top pattern 215a. That is, the bottom pattern 215b may have an equiangular trapezoid shape that includes a top side 215b1 including the top side 215a1 of the top pattern 215a and a bottom side 215b2 having a third width narrower than the second width. A length of the bottom pattern 215b and a length between the top side 215b1 and the bottom side 215b2 may each be the same as that of the top side 215b1. Therefore, the bottom pattern 215b may be inclined by a first angle "θ1" from the top side 215a1 of the top pattern 215a, and thus, the bottom side 215b2 of the bottom pattern 215b may be spaced apart from a bottom of the body 211 by a certain height and may overlap a portion of the top pattern 215a. The axis of inclination may coincide with the top sides 215a1, 215b1 of the top and bottom patterns 215a, 215b. Here, the first angle "θ1" may be adjusted to 4 degrees to 10 degrees for outputting light, irradiated through the inside of the body 211, toward the light guide plate 210. The bottom pattern 215b may transfer incident light to a top of the light guide plate 210.

The lower surface pattern 215c may face the light incident part 210a of the light guide plate 210, may be provided in an equiangular trapezoid shape between the bottom side 215a2 of the top pattern 215a and the bottom side 215b2 of the bottom pattern 215b, and may be inclined. In this case, the lower surface pattern 215c may be inclined by a second angle "θ2" from the bottom side 215a2 of the top pattern 215a. The axis of inclination may coincide with the bottom side 215a2 of the top pattern 215a. Here, the second angle "θ2" may be adjusted to 45 degrees or more so that light incident through the inside of the body 211 is scattered without being totally reflected by the lower surface pattern 215c.

The first side pattern 215d may be provided in a triangular shape between one side of the top pattern 215a and one side of the bottom pattern 215b and may be inclined. The first side pattern 215d may guide the light incident through the inside of the body 211 to travel into a partial luminance area, thereby enhancing a linearity of the incident light.

The second side pattern 215e may be provided in a triangular shape between the other side of the top pattern 215a and the other side of the bottom pattern 215b to face the first side pattern 215d and may be inclined. The second side pattern 215e may guide the light incident through the inside of the body 211 to travel into the partial luminance area, thereby enhancing a linearity of the incident light.

Figure 13A:
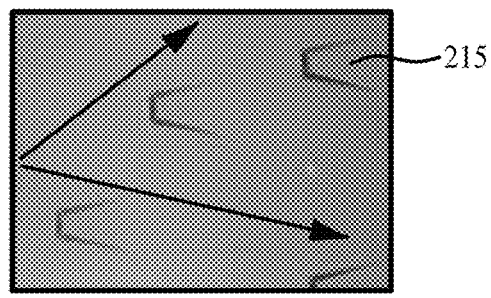
FIGS. 13A to 13C are diagrams for describing a light path based on a density of the lower optical pattern illustrated in FIG. 11.
Figure 13B:
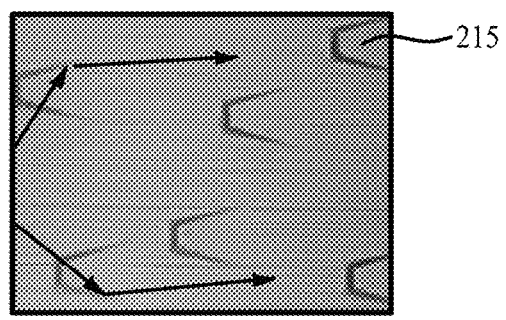
Figure 13C:
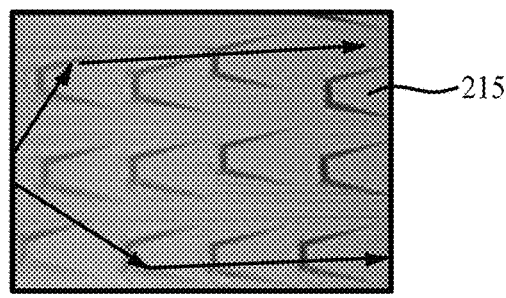

The lower optical pattern 215 may be provided to have a density which progressively increases in a direction from the light incident part 210a to the light non-incident part 210b of the light guide plate 210. For example, a plurality of lower optical patterns 215 may be arranged in a row in a direction from a first long side of the light guide plate 210 to a second long side of the light guide plate 210, and a plurality of such rows (each having a plurality lower optical patterns 215) may be arranged in parallel, wherein in the direction from the light incident part 210a to the light non-incident part 210b the distance between respective adjacent rows progressively decreases, as shown in FIG. 11. Here, as illustrated in FIG. 13A, the lower optical pattern 215 which is disposed in a light incident area adjacent to the light incident part 210a of the body 211 may have a relatively low density so as not to obstruct diffusion of light incident on the light incident part 210a of the body 211. Also, as illustrated in FIGS. 13B and 13C, the lower optical pattern 215 which is provided from a center portion of the body 211 to the light non-incident part 210b may have a relatively high density for guiding a path of light, which is diffused in a light incident area of the body 211 and irradiated, to further enhance a linearity of the light.

Figure 14:
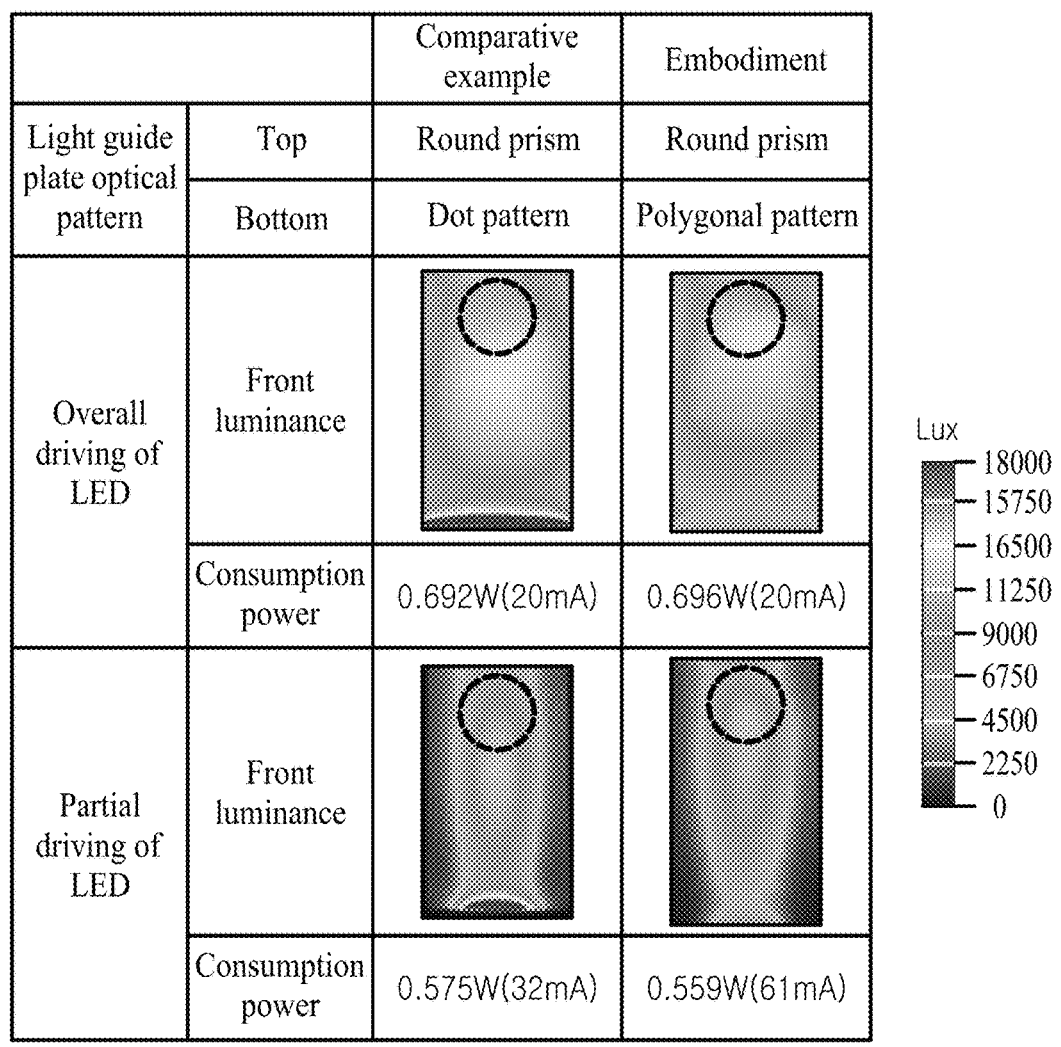
FIG. 14 is a diagram showing a simulation result of front luminance and power consumption in a backlight unit including a light guide plate according to an embodiment of the present invention and a comparative example.

FIG. 14 is a diagram showing a simulation result of front luminance and power consumption in a backlight unit including a light guide plate according to an embodiment of the present invention and a comparative example. Here, the light guide plate according to an embodiment of the present invention includes an upper optical pattern including a round prism pattern and a lower optical pattern including a polygonal pattern, and a light guide plate according to the comparative example includes an upper optical pattern including a round prism pattern and a lower optical pattern including a dot pattern.

Referring to FIG. 14, in an embodiment of the present invention, it can be seen that when some LED packages are driven, a linearity of light based on the upper optical pattern is enhanced, and a density of the lower optical pattern and a linearity of light based on first and second side surfaces of the lower optical pattern are enhanced, whereby light incident on the light guide plate is intensively output in an area corresponding to a fast execution area (a circular dot line) of a liquid crystal display panel.

On the other hand, in the comparative example, it can be seen that when some LED packages are driven, only a linearity of light based on the upper optical pattern is provided, and thus, light is output in a whole partial luminance area of the light guide plate including a fast execution area (a circular dot line) of a liquid crystal display panel.

Therefore, in an embodiment of the present invention, since the lower optical pattern including the polygonal pattern is provided on a bottom of the light guide plate, the amount of light which is output in the area corresponding to the fast execution area (the circular dot line) of the liquid crystal display panel increases effectively.

In an embodiment of the present invention, it has been measured that power consumption is reduced by 19.4% in comparison with a case where all LED packages are driven. In the comparative example, it has been measured that power consumption is reduced by 16.9% in comparison with a case where all LED packages are driven. Accordingly, it can be seen that power consumption is further reduced by 3% in an embodiment of the present invention than the comparative example.

Figure 15:
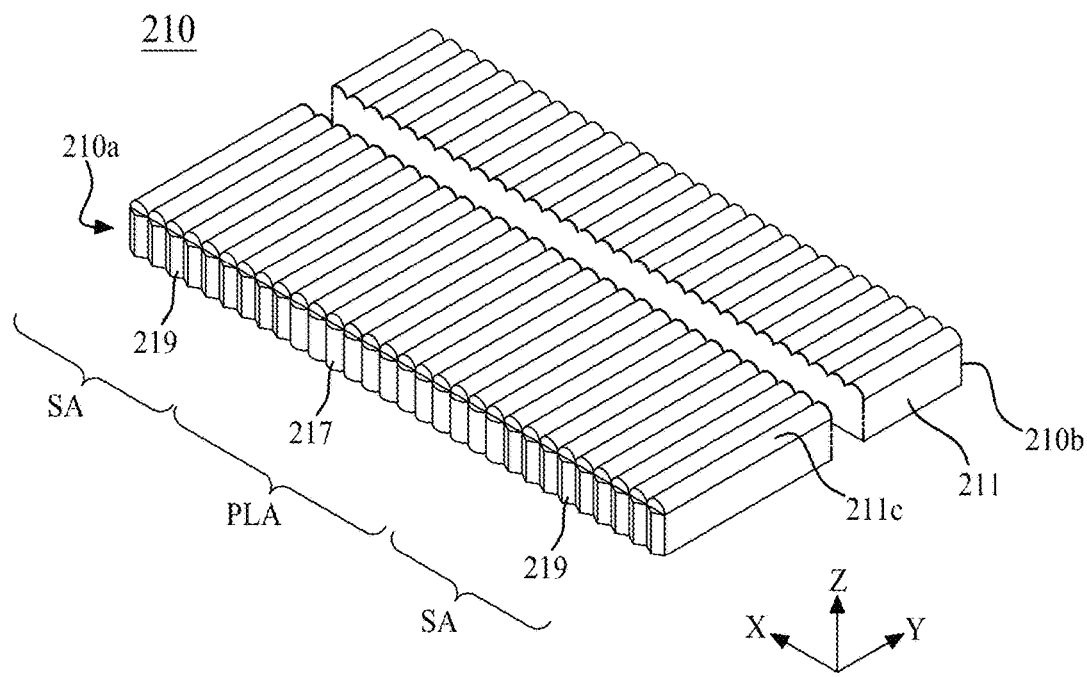
FIG. 15 is a diagram for describing a light guide plate according to a third embodiment of the present invention.
Figure 16:
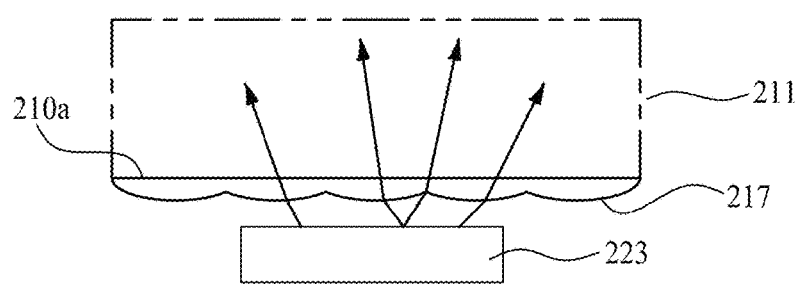
FIG. 16 is a diagram for describing a side light collection pattern illustrated in FIG. 15.
Figure 17:
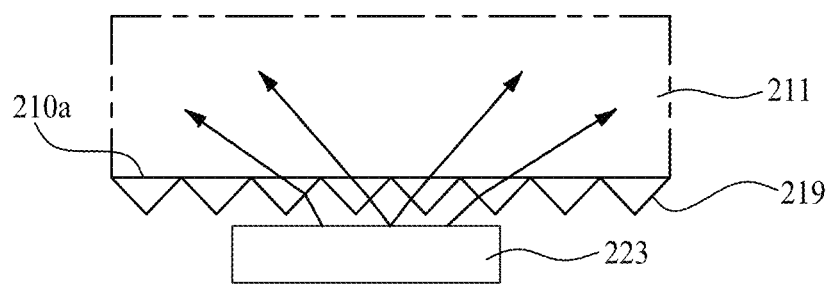
FIG. 17 is a diagram for describing a side diffusion pattern illustrated in FIG. 15.

FIG. 15 is a diagram for describing a light guide plate according to a third embodiment of the present invention. FIG. 16 is a diagram for describing a side light collection pattern illustrated in FIG. 15. FIG. 17 is a diagram for describing a side diffusion pattern illustrated in FIG. 15. The light guide plate according to the third embodiment of the present invention is implemented by adding a side light collection pattern 217 and a side diffusion pattern 219 into the light incident part of the light guide plate according to the first or second embodiment. Hereinafter, therefore, only the side light collection pattern 217 and the side diffusion pattern 219 added into the light incident part of the light guide plate among elements of the light guide plate according to the third embodiment of the present invention will be described, and descriptions of the other elements are not repeated.

Referring to FIGS. 15 to 17, the side light collection pattern 217 may be used to control the partial luminance of a partial luminance area PLA when a light source unit is divisionally driven, and may be provided in the body 211, namely, a light incident part 210a corresponding to the partial luminance area PLA defined in a light guide plate 210. Here, the partial luminance area PLA may be defined as an area overlapping a partial display area defined in a liquid crystal display panel, and for example, may be defined as a center portion of a short side with respect to a short side lengthwise direction of the body 211.

The side light collection pattern 217 may collect light directly incident from an LED package 223 and may transfer the collected light to a long distance in the partial luminance area PLA, thereby increasing the amount of light in an area far away from the light incident part 210a in the partial luminance area PLA and minimizing the amount of light which travels to a surrounding area SA of the partial luminance area PLA. To this end, the side light collection pattern 217 according to an embodiment may include a plurality of lenticular lens patterns which long extend (in other words, whose lens axes extend) from a top to a bottom of the body 211 along a thickness direction Z of the body 211 and protrude in parallel from one side surface of the body 211.

The side diffusion pattern 219 may be used to make luminance of the light guide plate 210 uniform when the light source unit is overall driven, and may be provided in the light incident part 210a corresponding to the surrounding area SA of the partial luminance area PLA. The side diffusion pattern 219 may diffuse light directly incident from the LED package 223 and may transfer the diffused light to the surrounding area SA of the partial luminance area PLA as well as the partial luminance area PLA, thereby increasing the amount of light in an area close to the light incident part 210a. To this end, the side diffusion pattern 219 according to an embodiment may include a plurality of prism patterns which long extend (in other words, whose side edges extend) from the top to the bottom of the body 211 along the thickness direction Z of the body 211 and protrude in parallel from one side surface of the body 211.

Figure 18A:
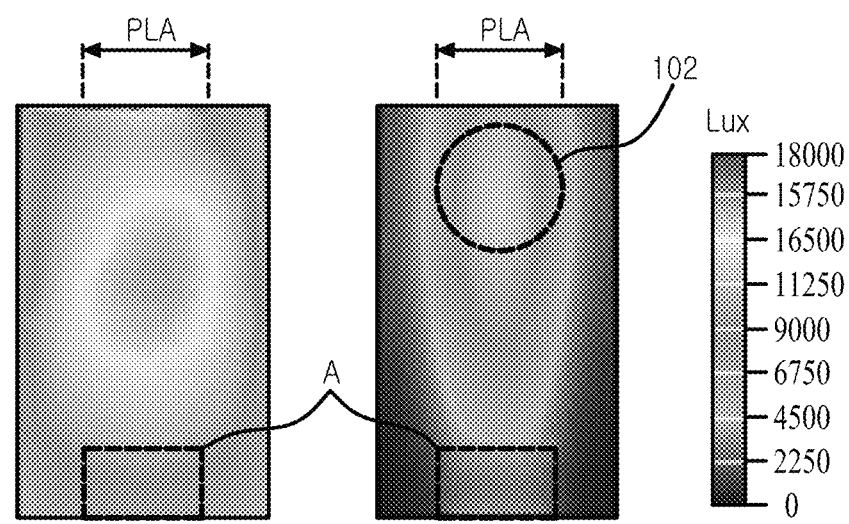
FIGS. 18A and 18B are diagrams showing a simulation result of front luminance when all light emitting diode (LED) packages are driven or some LED packages are driven, in a light guide plate according to a third embodiment of the present invention and a light guide plate according to a comparative example.
Figure 18B:
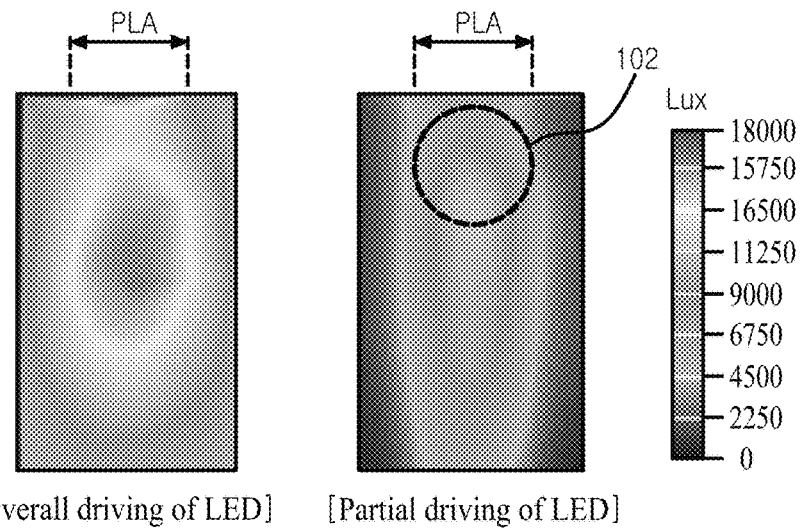

FIGS. 18A and 18B are diagrams showing a simulation result of front luminance when all light emitting diode (LED) packages are driven or some LED packages are driven, in a light guide plate according to a third embodiment of the present invention and a light guide plate according to a comparative example.

First, as shown in FIG. 18A, in the light guide plate according to the third embodiment of the present invention, it can be seen that when all LED packages are driven, light incident on a light incident part is collected by a side light collection pattern to travel in a partial luminance area PLA, and is diffused by a side diffusion pattern to travel to the partial luminance area PLA as well as a surrounding area of the partial luminance area PLA, whereby the light guide plate has wholly uniform luminance. In this case, luminance in an area A adjacent to the side light collection pattern is reduced due to collection of light by the side light collection pattern, but is compensated for by light which is diffused by the side diffusion pattern adjacent to the side light collection pattern and irradiated, whereby the light guide plate has wholly uniform luminance. In addition, in FIG. 18A, a luminance of a center portion of the light guide plate is relatively high. This is because a luminance of a center portion of the liquid crystal display panel is relatively high.

Moreover, in the light guide plate according to the third embodiment of the present invention, it can be seen that when some LED packages are driven, light incident on only the side light collection pattern provided in the light incident part in the partial luminance area PLA is collected by the side light collection pattern to travel to a long-distance area in the partial luminance area PLA, and thus, the light guide plate has constant luminance in only the partial luminance area PLA. In this case, it can be seen that luminance in an area A adjacent to the side light collection pattern is reduced because light is transferred to a long distance by using the side light collection pattern, but luminance in the partial luminance area PLA overlapping a fast execution screen 102 of the liquid crystal display panel increases because light is transferred to a long distance by using the side light collection pattern. Accordingly, in the present embodiment, only a luminance of the partial luminance area PLA overlapping the fast execution screen 102 of the liquid crystal display panel is efficiently controlled by using the side light collection pattern provided in the light incident part in the partial luminance area PLA.

As shown in FIG. 18B, a light guide plate according to the comparative example includes a side diffusion pattern which is provided in a whole portion of a light incident part. In the light guide plate according to the comparative example, it can be seen that when all LED packages are driven, light incident on the light incident part is diffused by the side diffusion pattern, and thus, luminance is relatively high in a center portion.

Moreover, in the light guide plate according to the comparative example, it can be seen that when some LED packages are driven, light incident on only the side diffusion pattern provided in the light incident part in the partial luminance area PLA is diffused by the side diffusion pattern and is located in a short-distance area in the partial luminance area PLA, and thus, luminance is wholly uniform in the partial luminance area PLA. For this reason, in the light guide plate according to the comparative example, due to light which is diffused by the side diffusion pattern provided in the light incident part in the partial luminance area PLA, it is difficult to control only a luminance of the partial luminance area PLA overlapping the fast execution screen 102 of the liquid crystal display panel.

The light guide plate according to the third embodiment of the present invention has relatively high luminance in the partial luminance area PLA defined based on the side light collection pattern 217 provided in the light incident part 210a, and due to a scattering pattern 219 provided in the light incident part 210a, the light guide plate has uniform luminance in a surrounding area SA as well as the partial luminance area PLA.

Figure 19:
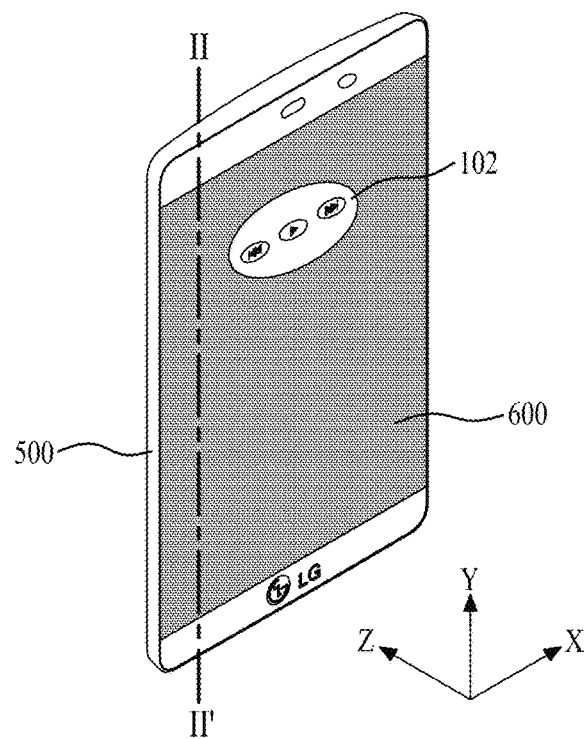
FIG. 19 is a perspective view illustrating a mobile device according to an embodiment of the present invention.
Figure 20:
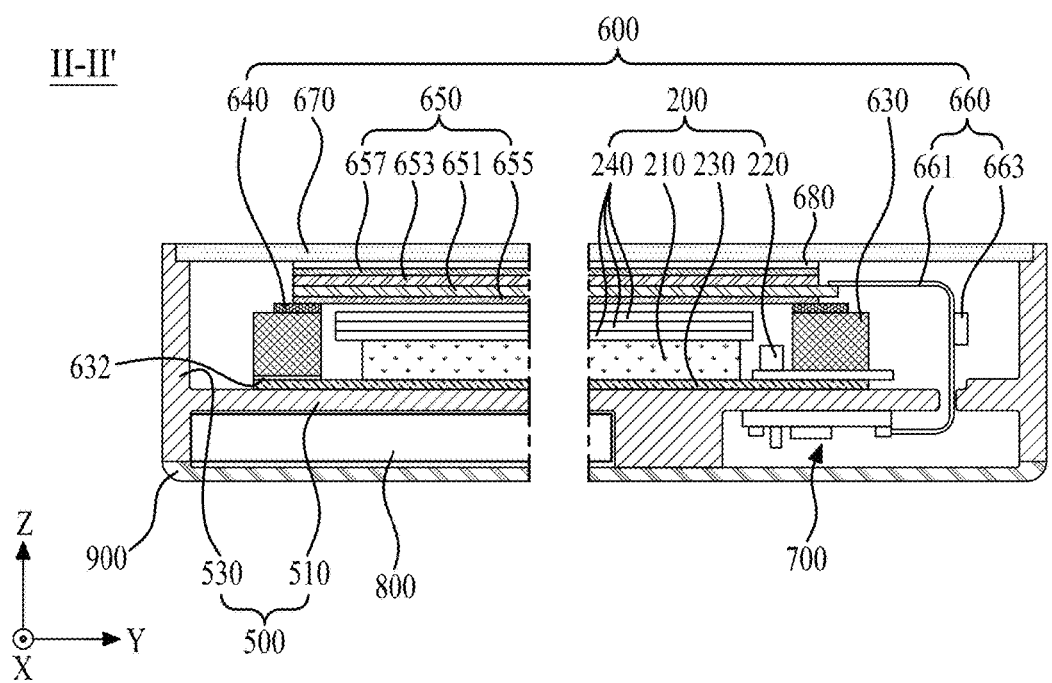
FIG. 20 is a cross-sectional view taken along line II-II' illustrated in FIG. 19.

FIG. 19 is a perspective view illustrating a mobile device according to an embodiment of the present invention, and FIG. 20 is a cross-sectional view taken along line II-II' illustrated in FIG. 19.

Referring to FIGS. 19 and 20, the mobile device according to an embodiment of the present invention may include a housing 500 and a liquid crystal display module 600.

The housing 500 may include an accommodating space which is defined by a bottom 510 and a housing side wall 530. The housing 500 may have a box shape with a top opened. The housing 500 may be formed of a metal material or a plastic material. Here, the housing 500 may be formed of a metal material (for example, aluminum (Al), invar, magnesium (Mg), or the like) for effectively dissipating heat which occurs in a liquid crystal display module 600.

The accommodating space may be disposed on the bottom 510 of the housing 500 and may accommodate the liquid crystal display module 600.

At least one system accommodating space may be provided in a rear surface of the housing 500. A system driving circuit unit 700, a battery 800 for supplying a driving power, a communication module (not shown), a power circuit (not shown), a memory (not shown), and/or the like which are included in a mobile device may be accommodated into the system accommodating space. The rear surface of the housing 500 may be covered by a rear cover 900. The rear cover 900 may be coupled to the rear surface of the housing 500 so as to be opened or closed for replacing the battery 800, but is not limited thereto. In other embodiments, when the mobile device uses an embedded-type battery 800, the rear cover 900 may be coupled to the rear surface of the housing 500 so as not to be opened or closed.

The liquid crystal display module 600 may display an image corresponding to an image signal supplied from the system driving circuit unit 700 or may detect a position touched by a user. That is, in a display mode, the liquid crystal display module 600 may display the image corresponding to the image signal supplied from the system driving circuit unit 700. Also, in a touch sensing mode, the liquid crystal display module 600 may detect the position touched by the user and may supply a detection signal, corresponding to the touched position, to the system driving circuit unit 700. Also, the liquid crystal display module 600 may display a fast execution screen 102 on a defined partial display area. The liquid crystal display module 600 according to an embodiment may include a backlight unit 200, a guide frame 630, a liquid crystal display panel 650, and a cover window 670.

The backlight unit 200 may include a light guide plate 210, a light source unit 220, a reflective sheet 230, and an optical sheet part 240. The backlight unit 200 has the same configuration as that of the backlight unit described above with reference to FIGS. 3 to 17, and thus, its detailed description is not repeated. Like reference numerals refer to like elements.

The guide frame 630 may be provided in a tetragonal belt shape and may support a rear edge of the liquid crystal display panel 650. Also, the guide frame 630 may surround a side surface of the backlight unit 200, thereby minimizing a movement of the backlight unit 200. The guide frame 630 according to an embodiment may be attached to an edge of the reflective sheet 230 and may support the rear edge of the liquid crystal display panel 650. To this end, the reflective sheet 230 may include an extension area that supports a bottom of the guide frame 630. The extension area of the reflective sheet 230 may extend from each of side surfaces of the reflective sheet 230 to overlap the bottom of the guide frame 630 and may be coupled to the bottom of the guide frame 630 by an adhesive 632.

The guide frame 630 may be physically coupled to the rear edge of the liquid crystal display panel 650 by a panel adhesive member 640. Here, the panel adhesive member 640 may be a double-sided tape, a thermocurable resin, a photocurable resin, a double-sided adhesive foam pad, or the like.

The liquid crystal display panel 650 may include a lower substrate 651 and an upper substrate 653 which are opposite-bonded to each other with a liquid crystal layer therebetween, and may display a certain image by using light irradiated from the backlight unit 200.

The lower substrate 651 may be a TFT array substrate and may include a plurality of pixels (not shown) respectively provided in a plurality of pixel areas where a plurality of gate lines (not shown) intersect a plurality of data lines (not shown). Each of the plurality of pixels may include a TFT (not shown) connected to a corresponding gate line and a corresponding data line, a pixel electrode connected to the TFT, and a common electrode which is provided adjacent to the pixel electrode and receives a common voltage.

A pad part (not shown) connected to each of a plurality of signal lines may be provided in a lower edge of the lower substrate 651 and may be connected to the panel driving circuit unit 660. Also, a gate driving circuit for supplying a gate signal to the gate lines of the liquid crystal display panel 650 may be provided on a left and/or right edge of the lower substrate 651. The gate driving circuit may be connected to the gate lines and may be manufactured simultaneously with a process of manufacturing the TFT of each pixel.

The upper substrate 653 may include a pixel defining pattern, which defines an opening area overlapping each pixel area provided in the lower substrate 651, and a color filter which is provided in the opening area. The upper substrate 653 may be opposite-bonded to the lower substrate 651 by a sealant with the liquid crystal layer therebetween and may cover all of the lower substrate 651 except the pad part of the lower substrate 651.

At least one of the lower substrate 651 and the upper substrate 653 may include an alignment layer (not shown) for adjusting a pre-tilt angle of liquid crystal. The liquid crystal layer may be disposed between the lower substrate 651 and the upper substrate 653 and may include liquid crystal molecules which are aligned in a horizontal direction according to a lateral electric field generated by a data voltage and the common voltage applied to each of the plurality of pixels.

A lower polarizing member 655 having a first polarization axis may be attached to the rear surface of the lower substrate 651, and an upper polarizing member 657 having a second polarization axis intersecting the first polarization axis may be attached to a front surface of the upper substrate 653.

In the liquid crystal display panel 650, the common electrode may be used as a touch sensing electrode in the touch sensing mode, and in the display mode, the common electrode may be used as a liquid crystal driving electrode along with the pixel electrode. That is, the liquid crystal display panel 650 may be an in-cell touch type liquid crystal display panel, and in more detail, the liquid crystal display panel 650 may be a self-capacitance in-cell touch type liquid crystal display panel. For example, the in-cell touch type liquid crystal display panel may be a liquid crystal display panel of a liquid crystal display device integrated with touch sensor disclosed in Korean Patent Publication No. 10-2013-0015584, but is not limited thereto.

The panel driving circuit unit 660 may be connected to the pad part provided on the lower substrate 651, and each pixel of the liquid crystal display panel 650 may be driven according to control by the system driving circuit unit 700, thereby displaying a certain color image on the liquid crystal display panel 650. Also, the panel driving circuit unit 660 may display the fast execution screen 102 on the partial display area defined in the liquid crystal display panel 650 according to control by the system driving circuit unit 700. The panel driving circuit unit 660 according to an embodiment may include a flexible circuit film 661 and a display driving integrated circuit (IC) 663.

The flexible circuit film 661 may be connected to the pad part provided on the lower substrate 651 and may be connected to the system driving circuit unit 700. The flexible circuit film 661 may provide an interface between the display driving IC 663 and the system driving circuit unit 700 and may transfer a signal, output from the display driving IC 663, to the pad part.

In the display mode, the display driving IC 663 may drive each pixel by using image data and a control signal which are supplied from the system driving circuit unit 700. Also, in the touch mode, the display driving IC 663 may supply a touch driving pulse to the common electrode through a touch driving line, may sense through the touch driving line a capacitance change of the common electrode caused by a user touch to generate touch position data, and may supply the touch position data to the system driving circuit unit 700.

The system driving circuit unit 700 may perform the overall control of the mobile device and may supply an image signal and the control signal to the liquid crystal display module 600. The system driving circuit unit 700 may execute an application corresponding to the touch position data supplied from the display driving IC 663.

In a standby mode of the mobile device, the system driving circuit unit 700 may execute a partial display application installed in the mobile device to display the fast execution screen 102 on the partial display area defined in a screen of the liquid crystal display panel 650 and may divisionally drive the light source unit 220 of the backlight unit 200 in order for light to be irradiated onto only a partial luminance area corresponding to the partial display area of the liquid crystal display panel 650. In this case, when an accessory cover (not shown) for protecting the mobile device covers the screen of the liquid crystal display panel 650, the system driving circuit unit 700 may drive the mobile device in the standby mode.

The cover window 670 may cover the whole front surface of the liquid crystal display panel 650 and may be supported by the housing side wall 530 of the housing 500. In this case, the cover window 670 may be physically attached to the whole front surface of the liquid crystal display panel 650 by a transparent adhesive 680, for example, an optical clear adhesive (OCA), an optical clear resin (OCR), or the like, thereby protecting the liquid crystal display panel 650 from an external impact. The cover window 670 may be formed of tempered glass, transparent plastic, a transparent film, or the like. For example, the cover window 670 may include at least one of sapphire glass and gorilla glass. As another example, the cover window 670 may include at least one of polyethyleneterephthalate, polyethylenapthanate, polycarbonate, polyethersulfone, and polynorborneen. The cover window 670 may be formed of tempered glass, based on scratch and transparency.

In the mobile device according to an embodiment of the present invention, when the fast execution screen 102 is displayed on the partial display area by partially driving the liquid crystal display panel 100, light may be irradiated onto only the partial luminance area corresponding to the partial display area of the liquid crystal display panel 650 by partially (divisionally) driving the backlight unit 200, and thus, power consumption is minimized in displaying the fast execution screen 102.

As described above, according to the embodiments of the present invention, the linearity of light incident through the light incident part is enhanced due to a combination of the upper optical pattern and the lower optical pattern, thereby providing a light guide plate that enables light to be partially output.

Moreover, according to the embodiments of the present invention, by using a partial output of light through the light guide plate, the light may be locally irradiated onto only a partial display area defined in the liquid crystal display panel.

Moreover, according to the embodiments of the present invention, when a fast execution screen is displayed on the partial display area by partially driving the liquid crystal display panel, light may be irradiated onto only the partial display area of the liquid crystal display panel by partially driving the backlight unit, thereby minimizing power consumption.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A light guide plate, comprising:
   a body having a light incident part at a first side surface of the body;
   an upper optical pattern at a top side of the body; and
   a lower optical pattern at a bottom side of the body,
   wherein the lower optical pattern is an embossed pattern protruding from the bottom side of the body and having a trapezoid shape,
   wherein a first end of the trapezoid shape has a first width and a second end of the trapezoid shape has a second width, and
   wherein the first end is closer to the light incident part than the second end, and wherein the first width is narrower than the second width.

2. The light guide plate of claim 1, wherein the trapezoid shape comprises a top pattern, a bottom pattern, a lower surface pattern, a first side pattern, and a second side pattern,
   wherein the top pattern is proximate the bottom side of the body, and
   wherein the top pattern has a trapezoid shape having a first size and including a top side having a first width and a bottom side having a second width narrower than the first width.

3. The light guide plate of claim 2, wherein the first width of the top side of the top pattern is two or more times the second width of the bottom side of the top pattern.

4. The light guide plate of claim 2, wherein the bottom pattern has a trapezoid shape which has a second size less than the first size and faces the top pattern.

5. The light guide plate of claim 4, wherein the bottom pattern includes a top side, which coincides with the top side of the top pattern, and a bottom side having a third width narrower than the second width.

6. The light guide plate of claim 5, wherein a length between the top side of the bottom pattern and the bottom side of the bottom pattern is the same as a length of the top side of the bottom pattern.

7. The light guide plate of claim 5, wherein the bottom pattern is inclined by a first angle from the top pattern, wherein the first angle is in the range from 4 degrees to 10 degrees, and wherein the axis of inclination coincides with the top sides of the top pattern and bottom pattern.

8. The light guide plate of claim 5, wherein the lower surface pattern faces the light incident part and is provided between the bottom side of the top pattern and the bottom side of the bottom pattern, and is inclined by a second angle from the top pattern,
   wherein the second angle is 45 degrees or more, and
   wherein the axis of inclination coincides with the bottom side of the top pattern,
   wherein the lower surface pattern has an equiangular trapezoid shape.

9. The light guide plate of claim 4, wherein the first and second side patterns are provided in a triangular shape between the top pattern and the bottom pattern and are inclined.

10. The light guide plate of claim 1, wherein the lower optical pattern has a density, which increases in a direction from the first side surface of the body to a second side surface of the body opposite the first side surface.

11. The light guide plate of claim 1, wherein the upper optical pattern comprises a plurality of lenticular lens patterns or round prism patterns extending in parallel along a direction from the first side surface of the body to a second side surface of the body opposite the first side surface.

12. The light guide plate of claim 11, wherein side surfaces of adjacent lenticular lens patterns or round prism patterns of the plurality of lenticular lens patterns or round prism patterns contact each other.

13. The light guide plate of claim 11, wherein:
the plurality of lenticular lens patterns or round prism patterns are spaced at constant intervals, or an interval of first lenticular lens patterns or round prisms patterns of the plurality of lenticular lens patterns or round prism patterns, which are disposed in a partial luminance area of the light guide plate, differs from an interval of second lenticular lens patterns or round prism patterns of the plurality of lenticular lens patterns or round prism patterns, which are disposed in an area of the light guide plate other than the partial luminance area.

14. The light guide plate of claim 11, wherein a width of the round prism patterns is in the range from 20 μm to 30 μm, and a height of the round prism patterns is in the range from 4 μm to 10 μm.

15. The light guide plate of claim 1, wherein the light incident part includes a side light collection pattern and a side diffusion pattern,
wherein the side light collection pattern includes a plurality of lenticular lens patterns in a partial luminance area corresponding to a partial display area, and
wherein the side diffusion pattern includes a plurality of prism patterns in a surrounding area of the partial luminance area.

16. The light guide plate of claim 11, wherein a width and a height of the round prism patterns are adjusted based on a size of a partial luminance area of the light guide plate.

17. The light guide plate of claim 11, wherein a vertical angle of the round prism pattern is 100 degrees to 120 degrees.

18. The light guide plate of claim 1, wherein the upper optical patterns comprises first upper optical patterns overlapping a partial luminance area of the light guide plate, and second upper optical patterns overlapping a surrounding area of the partial luminance area of the light guide plate.

19. The light guide plate of claim 18, wherein side surfaces of adjacent first upper optical patterns overlap each other.

20. A backlight unit, comprising:
a light guide plate according to claim 1, wherein the backlight unit is configured to irradiate light selectively onto a whole display area of a liquid crystal display panel or onto a partial display area defined in the liquid crystal display panel; and
a light source unit adjacent to the light incident part of the light guide plate.

* * * * *